United States Patent [19]

Squillace et al.

[11] 4,162,853
[45] Jul. 31, 1979

[54] ILLUMINATION MEASUREMENT DEVICE

[75] Inventors: Stephen S. Squillace, St. Clair Shores; David L. DiLaura; Steven M. Stannard, both of Ann Arbor, all of Mich.

[73] Assignee: Smith, Hinchman & Grylls Associates, Inc., Detroit, Mich.

[21] Appl. No.: 869,785

[22] Filed: Jan. 16, 1978

Related U.S. Application Data

[63] Continuation of Ser. No. 744,641, Nov. 24, 1976, abandoned.

[51] Int. Cl.² .......................... G01J 1/10; G01J 1/42; G02B 27/32
[52] U.S. Cl. .................................. 356/225; 356/229; 356/256
[58] Field of Search ...................... 356/225, 228–232, 356/236, 256

[56] References Cited

U.S. PATENT DOCUMENTS

| | | | |
|---|---|---|---|
| 2,651,963 | 9/1953 | Bischoff | 356/121 |
| 3,416,867 | 12/1968 | Biber | 356/230 |
| 3,591,297 | 7/1971 | Hagner | 356/219 |
| 3,867,036 | 2/1975 | Detwiler et al. | 356/121 |
| 3,912,399 | 10/1975 | Griffith et al. | 356/229 |

OTHER PUBLICATIONS

H. R. Blackwell, "Development of Procedures and Instruments for Visual Task Evaluation", Illuminating Engineering, Apr. 1970, pp. 267–291.
RQQ Report No. 4, Illuminating Engineering, vol. 65, Aug. 1970, pp. 504–510.
D. L. DiLaura, "On the Computation of Equivalent Sphere Illumination", Journal of IES, vol. 4, No. 2, Jan. 1975, pp. 129–149.

*Primary Examiner*—Rolf G. Hille
*Attorney, Agent, or Firm*—Harness, Dickey & Pierce

[57] ABSTRACT

A system and apparatus for providing a measure of ESI (equivalent sphere illumination) as a function of Lb (background luminance) and Lt (task luminance) and in which a pair of envelopes are provided each having a varying transmittance such that one envelope can provide an indication of the term (Lb-Lt) and the other an indication of Lb whereby ESI can be determined.

28 Claims, 7 Drawing Figures

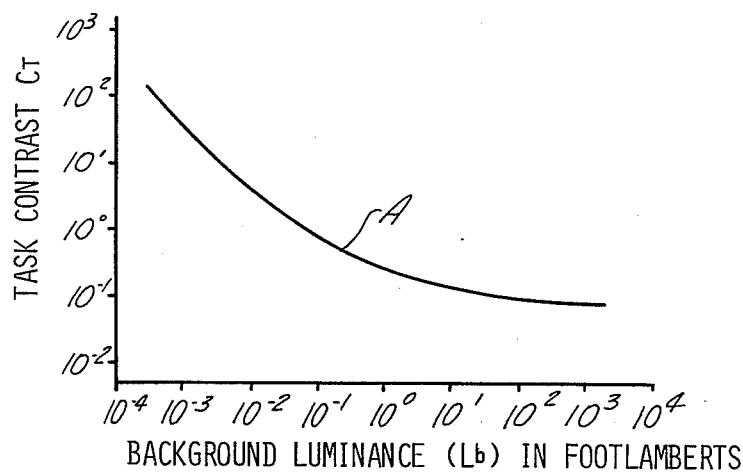
Fig-1
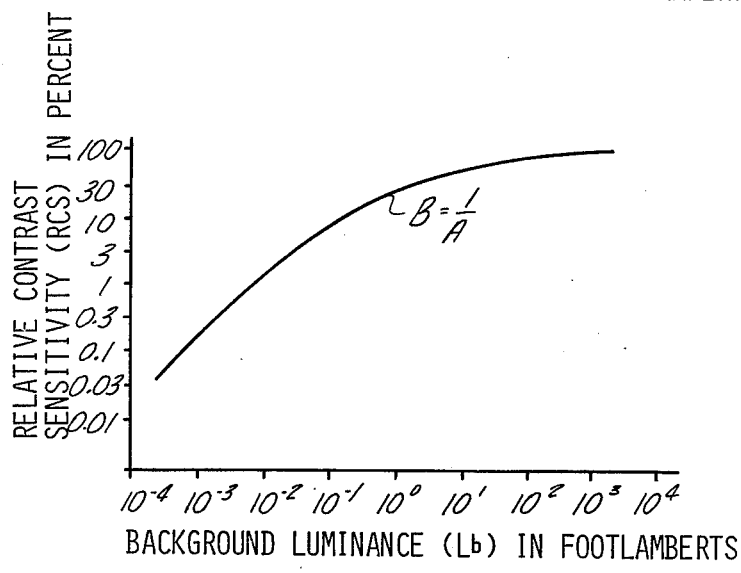
Fig-2
Fig-3
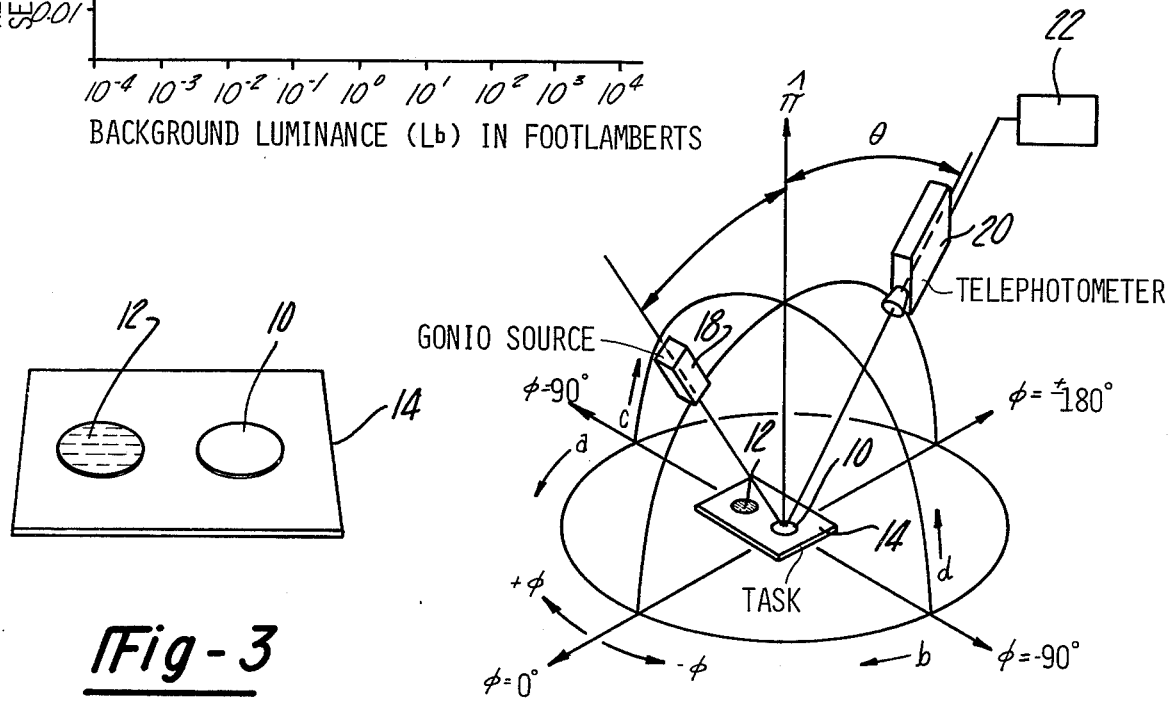
Fig-4

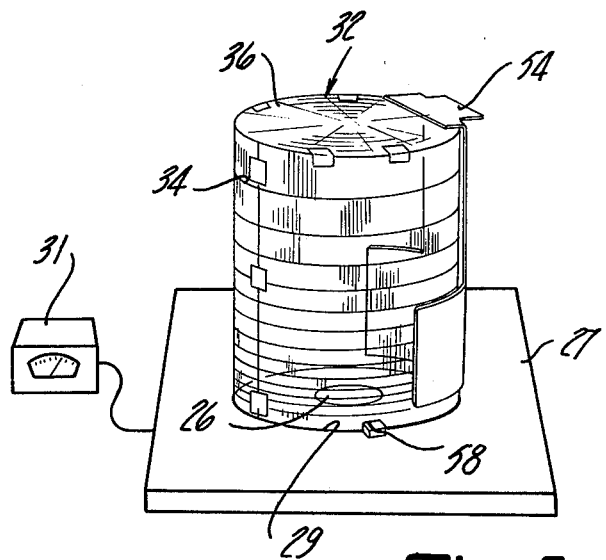
Fig-5
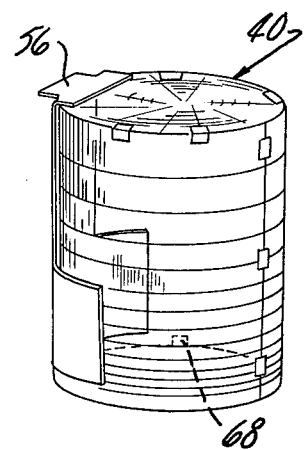
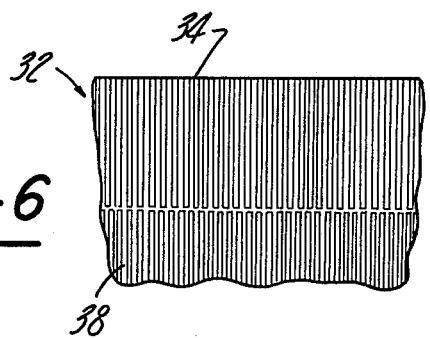
Fig-6
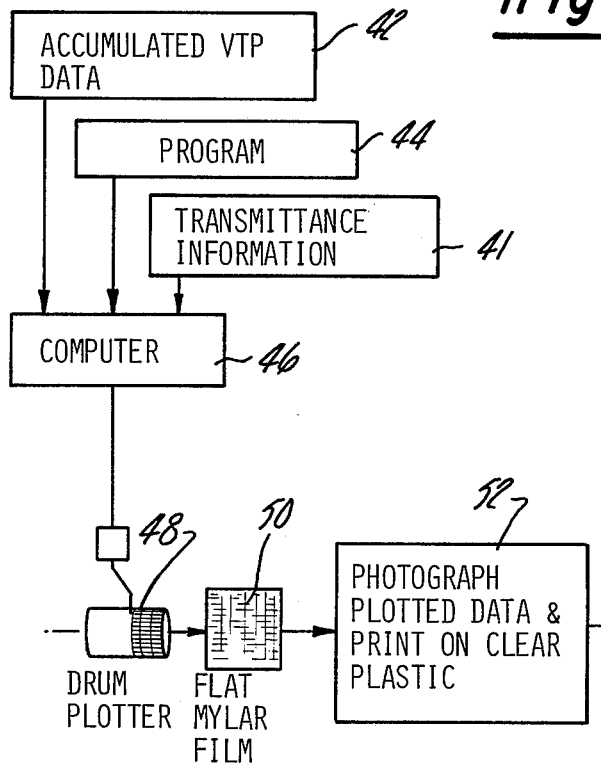
Fig-7
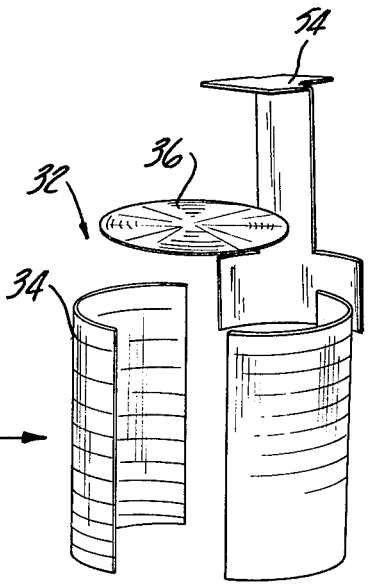

ILLUMINATION MEASUREMENT DEVICE

This is a continuation of application Ser. No. 744,641, filed Nov. 24, 1976, now abandoned.

SUMMARY

Background of the Invention

The present invention relates to a system and apparatus for determining the effectiveness of illumination systems and more particularly to a system and apparatus for providing a measure of ESI.

There has been a significant amount of difficulty in determining or measuring the effectiveness of lighting systems in providing adequate visibility above threshold for the performance of various working functions. In the past a simplistic solution would be to 'overkill' by providing a system of such intensity as to vastly exceed the actual intensity needed. The prior solution, however, is now being realized as unsatisfactory in view of the extra cost involved in unnecessary fixtures and further in view of the waste of energy in providing excess illuminating intensity. One problem in achieving adequate visibility (above threshold) has been in providing a means of measuring or quantifying the effectiveness of a lighting system. One reason for the difficulty is that the physiological characteristics of the human eye are involved. Another related factor is that different 'tasks' as perceived by the human eye may, for adequate lighting, vary in their lighting needs. It has, however, been determined empirically on a psychophysical basis that an ESI level for adequate lighting can be determined for various tasks or targets of interest; thus pencil on bond paper will have a different ESI level than black print on glossy paper, etc.

A serious problem, however, was that while ESI could be measured it required elaborate and expensive equipment and has generally been relegated to the laboratory. In the present invention, however, a simple and relatively inexpensive system and apparatus have been provided whereby ESI can be quickly determined at the desired location.

The above is done by providing two envelopes for each 'task' of interest, i.e. pencil on bond paper, etc. Each envelope will effectively enclose 180 spherical degrees and will be provided with a variable surface transmittance such that the total flux through one envelope will provide an indication of the magnitude of the term (Lb−Lt) and the total flux through the other envelope will provide an indication of the magnitude of Lb. As will be seen, knowing (Lb−Lt) and Lb, ESI can be easily determined.

A significant part of the invention is in the generation of the information and the provision of the envelopes having the desired varying transmittances.

Therefore it is an object of the present invention to provide a novel method and apparatus for determining ESI.

It is another object of the present invention to provide a novel method and apparatus for providing means of measuring (Lb−Lt) and Lb for a selected task whereby ESI for that task can be determined for a given lighting system.

It is another object of the present invention to provide envelopes for varying transmittances to provide means for determining the (Lb−Lt) and Lb on a task by a lighting system to be evaluated.

It is still another object of the invention to provide novel means for providing the above noted envelopes.

It is a general object of the present invention to provide a novel means for measuring the effectiveness of an illumination system in a specific lighting environment.

Other objects, features, and advantages of the present invention will become apparent from the subsequent description and the appended claims, taken in conjunction with the accompanying drawings, in which:

FIG. 1 is a curve depicting the relationship of Task Contrast to Background Luminance;

FIG. 2 is a curve depicting the relationship of Relative Contrast Sensitivity;

FIG. 3 is a pictorial view of a slide construction utilized in determining task and background reflectance factors;

FIG. 4 is a general pictorial representation of a Visual Task Photometer as used in determining task and background reflectance factors;

FIG. 5 depicts the apparatus of the present invention with a pair of envelopes, one for providing an indication of (Lb−Lt) and the other an indication of Lb;

FIG. 6 is a fragmentary view to increased scale of a portion of one of the envelopes noted; and FIG. 7 is a general schematic diagram depicting steps in the development and construction of the envelopes of FIG. 5.

ESI (equivalent sphere illumination) can be defined as the level of sphere illumination which would produce task visibility equivalent to that produced by a specific lighting environment, (the above definition and others subsequently used are as stated in IES Lighting Handbook, Published by Illuminating Engineering Society, Fifth Edition, 1972). In the above definition of ESI, 'sphere illumination' can be the illumination on a task from a source providing equal luminous intensity (candelas) from all directions, such as an illuminated sphere with the task located at the center. The 'task' conventionally designates those details and objects that must be seen for the performance of a given activity, and includes the immediate background of the details or objects.

It has been established that ESI can be determined as a function of Lb and Lt (background and task luminance, respectively) and hence can be determined by the following:

$$ESI = (Lbe)/(\rho b) \tag{1}$$

where $$Lbe = RCS^{-1}[RCS(Lb) \cdot CRF]; \tag{1a}$$

the dimension of ESI is "foot-candles" and the noted terms are as follows:

Lbe    Effective Background Luminance in "foot-lamberts"

$\rho b$    Sphere Reflectance Factor of Target Background

RCS(Lb)    Relative Contrast Sensitivity, as a function of background luminance (Lb) and is the reciprocal of the relationship of Task Contrast at threshold $C_T$ versus background luminance Lb, normalized such as to be relative and to be expressed as a percentage.

$RCS^{-1}$    The functional inverse of RCS(Lb)

CRF    Contrast Rendition Factor $C_T$    Task Contrast at threshold

Since RCS(Lb) is a function of $C_T$, a brief explanation of $C_T$ should be initially provided. The term $C_T$ is the Task Contrast at threshold as a function of background luminance (Lb). The Task Contrast $C_T$ versus background luminance (Lb) has been empirically determined and can be set forth in a curve A shown in FIG. 1. Curve A was determined by plotting the results of a number of normal observers adjusting contrast to a threshold level between invisibility and visibility of a 0°04′ luminous disk (of a preselected varying luminance) as observed for a selected time interval. The Task Contrast is a dimensionless number.

Note the Task Contrast, $C_T$, then represents an indication of threshold contrast at which the task luminance is of a magnitude just sufficient to provide threshold visibility for a given background luminance; this can be expressed by the following relationship:

$$C_T = \frac{|Lb - Lt|}{Lb}, \qquad (2)$$

where
Lb   Background Luminance
Lt   Task Luminance sufficient to provide threshold visibility for the given Lb.

A more detailed description of the derivation of curve A is set forth in IES Lighting Handbook, supra, and that text is incorporated herein by reference.

RCS is the Relative Contrast Sensitivity and is determined by a curve B (FIG. 2) which is the reciprocal of curve A and has been normalized such as to be expressed in relative terms, i.e. a percentage. Thus this curve provides an empirical means for determining RCS as a percentage and as a function of background luminance Lb. Thus knowing the background luminance (Lb) the RCS term can be determined from the curve of FIG. 2. The RCS term, being a percentage, is dimensionless.

As can be seen from equation (1) for ESI the Relative Contrast Sensitivity (RCS(Lb)) is operated upon by the Contrast Rendition Factor, CRF. CRF can be defined as the ratio of visual task contrast with a given lighting environment to the task contrast with sphere illumination and hence can be expressed by the following relationship:

$$CRF = C/C_o, \qquad (3)$$

where
C is the measured contrast for the task in the actual lighting environment to be evaluated and can be determined by the relationship $$C = \frac{|Lb - Lt|}{Lb},$$

unlike the determination of $C_T$, C is not a threshold indication;
$C_o$ is the contrast of the task relative to the background as measured in a photometric sphere.

Note that $C_o$ is determined in the controlled referenced condition of diffuse illumination while C may or may not involve diffuse illumination. Hence the ratio of $C/C_o$ will provide a factor to compensate for any veiling effect resulting from reflection which produces a reflected luminance veil reducing task contrast and visibility.

The term $RCS^{-1}$ represents the functional inverse of RCS(Lb) with the argument of the term $RCS^{-1}$ being [RCS(Lb)·CRF]. The value of this term is determined by use of the RCS versus Lb curve of FIG. 2, by noting the new percentage of the term [RCS(Lb)·CRF] and determining the resultant value of background luminance which now is Lbe, the Effective Background Luminance. This term ($RCS^{-1}$) is not dimensionless but is in foot lamberts.

The last term in equation (1) for ESI is $\rho b$, the sphere reflectance factor of the target. This in general is the ratio of reflected flux to incident flux where the target is illuminated in a sphere and the reflected flux is that received at a preselected viewing angle relative to the target; $\rho b$ has a dimension of foot-lamberts over foot-candles, and will always have a value less than one. Thus, since Lbe has a dimension of foot lamberts ESI will have a dimension of foot candles.

An examination of all of the terms utilized in equations (1) and (1b) for ESI shows that a determination of Lb and Lt in the lighting environment to be evaluated will provide sufficient information whereby ESI can be determined. The value for RCS can be determined from curve B of FIG. 2 knowning Lb. CRF (see equation (3)) can be developed by a determination of C which can be calculated knowing | Lb−Lt | and Lb of the environment and $C_o$ which can be predetermined in the laboratory. The significant point is that an environmental measurement of luminance Lb, and (Lb−Lt) or Lt will provide the only information required from the environment to be evaluated for a determination of ESI.

First let us examine the term luminance (L), whether it be background (Lb) or task (Lt); thus $$L = \Sigma E\beta,$$

where

E is the illuminance incident on the target from a source and from a given direction; E is represented in foot-candles.
$\beta$ is the bidirectional reflectance factor for a preselected viewing angle for the illuminance from a source and is the ratio of incident light from that source to reflected light at a predetermined viewing angle; the dimension of $\beta$ is foot-lamberts over foot-candles; and therefore
$\Sigma E\beta$ is the sum of the products of each illuminance E, from all sources from all directions, times each of the associated reflectance factors $\beta$;

Note that $\beta$ is a constant ratio and is independent of the magnitude of incident light. For a point source of light, if $\beta$ were known, L could be determined simply by measuring the intensity of incident illuminance E from that source. In other words, the magnitude of L could be determined without measuring the reflected light. Now if the magnitude of illuminance E were modulated by a factor representing $\beta$ then the intensity of incident light would actually be that of the reflected light and a reading of luminance L of the target could be obtained by reading the intensity of the light (as modulated) incident on the target. This is what is done in the present invention.

As previously noted ESI levels for adequate lighting have been and can be determined for various tasks. The problem is to provide some means of quantitatively evaluating the effectiveness of the lighting system in the environment in providing the necessary ESI level. Because the eye may be observing the task at different angles of declination (from the vertical) there may be the need to provide ESI level measurements at more than one angle. The accepted angles of declination are 10°, 25°, 32½°, 40° and 55°; for office work the most significant viewing angle is 25°.

In the system of the present invention, two envelopes are developed one indicative of background luminance minus task luminance, I Lb−Lt I, and another indicative of background luminance, Lb, and the intensity of the incident light on a target through each envelope is measured. As will be seen, the transmittances of the envelopes are varied on the surfaces of the envelopes to provide an attenuation at preselected intervals having a magnitude in accordance with the reflectance factor $\beta$ for a known viewing angle which is operative on the incident light through that interval. In order to generate the information necessary for the envelopes, determination of reflectance factors $\beta$ for the background and the task are made. We are referring now to samples of the real background and real task to be encountered at the actual work site at which the lighting system is to be evaluated. This requires two separate targets. Looking now to FIG. 3, a first target 10 can be plain and would be indicative of the surface of the real background at the work site surrounding the task. A second target 12 would be a replica of the real task, i.e. type on white paper at the work site. In practice these two targets 10, 12 are mounted on a single slide 14.

The slide 14 is then located on a Visual Task Photometer 16, generally pictorially shown in FIG. 4, a device well known in the art. First the background target 10 is located in a position to receive collimated light from a collimated light source 18. A receiving lense 20 is located at a selected position and focused on the target 10 to receive the reflected light therefrom. The receiving lense 20 is located at a selected viewing angle $\theta$ which represents the desired angle of declination from the vertical V. Thus the angle could be 25° etc., as previously noted. The light source 18 is moved through a series of positions through 180° of azimuth (from a to b) and 90° of elevation (from c to d). This is done in 5° increments. At each position of incident light from source 18, the reflected light or luminance from target 10 via lense 20 is measured by an appropriate photoresponsive apparatus 22. The above will provide at each 5° location an indication of background luminance of target 10 resulting from the light from source 18. The intensity of the light source will be constant and can be determined whereby the magnitude of incident light can be known. With this information the background reflectance factor $\beta b$ at each angle can be determined. Next the process is repeated with the task target 12 and again the task reflectance factor $\beta t$ at each angle can be determined.

Next an envelope is created having a transmittance at each 5° location as a function of the background reflectance factor $\beta b$ at that location. The light incident on a photoresponsive device (positioned at the target location) through the envelope would provide background luminance Lb. A second envelope could be created for task reflectance factor $\beta t$ whereby task luminance Lt could be determined. From the prior discussion it was noted that Lt was never used alone but only in the term (Lb-Lt); hence for better accuracy the second envelope was provided by subtracting the reflectance factor $\beta t$ from $\beta b$ for each 5° location whereby the term (Lb-Lt) could be determined.

Before discussing the details of the means of providing the noted envelopes let us consider now the mode of operation of the system as described hereto.

Looking now to FIG. 5 a light receptor 26 is shown mounted to a base 28 and is connected with an indicating meter 31 which provides an indication of total foot candles incident on light receptor 26. The base 28 has a circular identation 29 concentrically surrounding the photometer 26. A first envelope 32 for providing a measure of Lb has a right cylindrical shape and includes a tubular side member 34 and a circular top 36 enclosing the top of side member 34. The envelope 32 is located over the light receptor 26 and is of a diameter similar to that of the indentation 29 whereby it can be accurately located relative to the photometer 26. The envelope 32 is made of a thin gauge plastic transparent material with each 5° location or section having a series of opaque lines thereon. FIG. 6 shows a blown up view of a portion of the envelope 32 in which opaque lines 38 are spaced at predetermined intervals such that the transmittance at the 5° section will be in proportion to the reflectance factor $\beta b$ operative by the background on the incident light at that angle. While the transmittance for each 5° section of the cylindrical envelope is modified as noted, it is assumed that the transmittance within the section is generally constant.

A second envelope 40 is similarly constructed for providing a measure of (Lb-Lt) with the transmittance modified at 5° sections in proportion with the resultant reflectance factor $(\beta b - \beta t)$.

Thus the reading from the photometer 26 for envelope 32 will provide background luminance Lb and the reading for envelope 40 will provide the luminance difference factor (Lb−Lt). Note that the values of Lb and (Lb−Lt) are obtained in the environment in which the lighting system is to be evaluated. With this information the ESI (see equations (1) and (1a)) for the system being evaluated can be readily determined.

Knowing the Lb the RCS(Lb) value can be obtained from the curve of FIG. 2. Next CRF can be determined from C/Co (see equation (3)). Since $C=(ILb-LtI)/Lb$ and ILb−LtI and Lb are known C can be determined. The information obtained from targets 10 and 12 with the Visual Task Photometer will provide the Lb and Lt necessary for determining $C_o$ since $C_o=(ILbo-LtoI)/Lbo$ where Lbo and Lto are the summations of the luminances obtained at the 5° intervals.

Knowing the CRF, the RCS(Lb) value is multiplied thereby and the inverse function of $RCS^{-1}$ is obtained from the curve of FIG. 2. Thus the product [RCS(Lb)·CRF] will provide a modified percentage from RCS(Lb) and the new percentage will be applied to the curve of FIG. 2 as the $RCS^{-1}$ function and the Effective Background Luminance, Lbe, will be obtained. Having Lbe it is only necessary to know $\rho b$ to find the resultant ESI.

The value of $\rho b$ can also be determined from the prior information secured by the Visual Task Photometer from the background target 10. Thus the value of $\rho b$ for the viewing angle selected can be determined by summing or integrating the illumination intensity of the incident light from the source 18 and the reflected light from the background 10. A simple division will then provide the value of the background reflectance factor $\rho b$. It should be noted that the values of $\rho b$ and $C_o$ are already available in published information for certain standard or known tasks and backgrounds.

We now have all the information needed to determine ESI and this can now be done with simple and inexpensive apparatus comprising the photometer 26 and two envelopes 32 and 40. As noted the curves for RCS (and $RCS^{-1}$) are known; the values of $C_o$ and $\rho b$ for backgrounds for known targets are available in published literature or can be predetermined in the lab with the Visual Task Photometer. And now the values of Lb and Lb−Lt can be easily measured at the site to provide all the information necessary for a determination of ESI.

It is important that the envelopes 32 and 40 be made of a clear or transparent material whereby diffusion is minimized. In this regard a DuPont plastic EN4 made of a polyester base and being four (4) mils thick has been found satisfactory.

The problem, however, was in providing a means of attenuating or modulating the transmittance such that envelopes for certain tasks and backgrounds could be created and reproduced.

By predetermination the number of lines per inch to produce a given magnitude of transmittance can be readily determined and this information is accumulated as at Transmittance Information 41 in FIG. 7. The information regarding $\beta b$ and $(\beta b - \beta t)$ as determined from the Visual Task Photometer 16 (VTP) is accumulated (see step 42 in FIG. 7) and provided to a computer 46 and the transmittance information from 41 is also provided to computer 46. Next a computer program 44 is provided to the computer 46 to utilize the VTP data 42 and Transmittance Information 41, and control the specific writing of line information by a drum plotter 48. Thus the line information resulting in lines 38 is first written in black India ink on a flat Mylar film 50 by a drum plotter 48; a California Computer Products, Model 565 plotter was found satisfactory. Here the number of lines per inch on a 5° section is written on the Mylar film 50 by the drum. The flat Mylar film 50 is produced and is the equivalent of the development of the tubular portions such as 34. A similar flat Mylar film is produced for the top 36. The computer program 44 is set to translate the information of $\beta b$ and $(\beta b - \beta t)$ from the Visual Task Photometer 16 to a cylindrical side wall and flat top basis. This can be done by determining and programming the equivalent areas on the cylindrical portion 34 and flat top 36 corresponding to each 5° interval. The details of the program are within the purview of one skilled in the art and hence do not constitute a part of the present invention and have been omitted for simplicity. Note that the Mylar films are translucent and while suitable for ink writing are not suitable for construction of the final envelopes which should be highly transparent.

After the line information has been written on the flat Mylar sheet 50, it is photographed at 52 and the negative is then used to reproduce copies on a flat sheet of transparent plastic. The one flat sheet can then be joined at the ends to form the cylindrical portions, such as 34, while the other can be cut to form the circular top and fixed to the top of the cylindrical portions such as 34. The diameter of cylindrical portions, such as 34, is preferably no less than three times that of the light receptor 26 and the same is true of the height of cylindrical portions relative to diameter of light receptor 26, i.e. preferably no less than three to one.

It has been found that an improved envelope can be produced by normalizing the data of $\beta b$ and $(\beta b - \beta t)$. Thus once the data has been gathered the highest value of $\beta b$ is determined and all of the values of $\beta b$ are divided by that amount. The result is that those sections having the maximum $\beta b$ will be clear and without lines 38 while the other sections will have correspondingly fewer lines 38, than if unnormalized, thereby assuring higher signal levels from photometer 26 resulting in greater clarity and accuracy. The same is done with the $(\beta b - \beta t)$ data. The resultant readings with normalized envelopes can be simply corrected by multiplication by a simple correction factor which can readily be determined for each envelope.

In applications such as desk work there will be an effect caused by the body shadow of the person working at that location. To account for this reduction in light on the task and background both envelopes 32 and 40 are provided with opaque portions 54 and 56, respectively, to compensate for that factor. Both envelopes 32 and 34 are provided with keying notches 58 and 60, respectively, which interfit with stops in groove 29 whereby both envelopes 32 and 34 will be properly oriented to both provide readings with the viewing angle in line for each.

Note that the plastic materials used for envelopes 32 and 40 are relatively inexpensive and note that the shape is simple and easy to construct and can be made from flat developments, i.e. spherical shapes have been eliminated. As noted, in operation the base 28 and two envelopes 32 and 40 are taken to the site to be evaluated. Each envelope 32 and 40 is placed over the light receptor 26 and will be indexed via notches 58 and 60 such that both will have their respective viewing angles in line. Next the base 28 is oriented to locate the viewing angles of envelopes 32 and 40 in line with the expected viewing angle of the person to be using that work site. Readings at meter 31 are taken with each envelope and the necessary calculation can be made to determine ESI. Note that the envelopes 32 and 40 are for a selected viewing angle and different envelopes would be required to determine ESI for a different expected viewing angle.

Thus a simple inexpensive apparatus and a simple system have been provided whereby the measurement of ESI can be readily obtained.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a system for determining ESI of a lighting system for a known task and known background, the apparatus comprising: photometer means for providing an output signal having a magnitude varying in accordance with the intensity of light incident thereon and including a receiving device for receiving the incident light, and first envelope means for encasing said receiving device and for modulating the intensity of the incident light from the lighting system as a function of the magnitude of the background reflectance factor $\beta b$ at preselected viewing angle whereby said photometer means will provide an indication of the magnitude of background luminance Lb and second envelope means for encasing said receiving device and for modulating the intensity of the incident light from the lighting system as a function of the magnitude of the task reflectance factor $\beta t$ at a preselected viewing angle whereby said photometer means will provide an indication of the magnitude of task luminance Lt, at least one of said first and second envelope means comprising a first light transmitting envelope with the transmittance of said first envelope varying at selectively spaced locations in accordance with variations in the reflectance $\beta$ effective on the incident light at each of said spaced locations, said first envelope having at least at some of said spaced locations blocking means being generally opaque for blocking out a preselected portion thereof such that the total transmittance through said some of said spaced locations has a magnitude related to the magnitude of reflectance $\beta$ effective on the incident light therethrough.

2. The system of claim 1 with said second envelope means modulating the intensity of the incident light as a function of the magnitude of the difference between background reflectance factor $\beta b$ and task reflectance factor $\beta t$ i.e. ($\beta b - \beta t$) whereby said photometer means will provide an indication of the magnitude of the difference between background luminance Lb and task luminance Lt, i.e. (Lb−Lt).

3. The system of claim 1 with at least one of said first and second envelope means including a first side wall portion having a development defining a flat planar surface.

4. The system of claim 1 with said blocking means comprising a plurality of spaced generally opaque lines.

5. The system of claim 1 with the variation in transmittance being varied for magnitudes of reflectance $\beta$ less than a predetermined maximum.

6. The system of claim 3 with said first envelope means having a preselected blocked out portion having a shape and size related to the shadow of a person located within the lighting system at a position to cast a shadow on the task.

7. The system of claim 1 with each said first and second envelope means including a side wall portion having a development defining a flat planar surface.

8. In a system for determining ESI of a lighting system for a known task and known background, the apparatus comprising: photometer means for providing an output signal having a magnitude varying in accordance with the intensity of light incident thereon and including a receiving device for receiving the incident light, and first envelope means for encasing said receiving device and for modulating the intensity of the incident light from the lighting system as a function of the magnitude of the background reflectance factor $\beta b$ at preselected viewing angle whereby said photometer means will provide an indication of the magnitude of background luminance Lb and second envelope means for encasing said receiving device and for modulating the intensity of the incident light from the lighting system as a function of the magnitude of the task reflectance factor $\beta t$ at a preselected viewing angle whereby said photometer means will provide an indication of the magnitude of task luminance Lt, said first and second envelope means comprising a first and second light transmitting envelope with the transmittance of said first envelope varying at first selectively spaced locations in accordance with variations in the background reflectance $\beta b$ of the background effective on the incident light at each of said first spaced locations and with said second light transmitting envelope varying at second selectively spaced location in accordance with variations in the task reflectance $\beta t$ of the task effective on the incident light at each of said second spaced locations, said first and second envelope each having at least at some of said first and second spaced locations first and second blocking means being generally opaque for blocking out a preselected portion thereof such that the total transmittance through said some of said first and second spaced locations has a magnitude related to the magnitude of the background reflectance $\beta b$ of the background effective on the incident light therethrough and to the magnitude of the task reflectance $\beta t$ of the task effective on the incident light therethrough.

9. The system of claim 8 with said first and second blocking means comprising a plurality of spaced generally opaque lines.

10. The system of claim 8 with the variation in transmittance through said first envelope being varied for magnitudes of background reflectance $\beta b$ less than a predetermined maximum and the variation in transmittance through said second envelope being varied for magnitudes of task reflectance $\beta t$ less than a predetermined maximum.

11. The system of claim 7 with each of said first and second envelope means having a preselected blocked out portion having a shape and size related to the shadow of a person located within the lighting system at a position to cast a shadow on the task.

12. The system of claim 8 with each of said first and second light transmitting envelopes having side walls defining right circular cylinders.

13. The system of claim 12 with each of said right cylinders having a development defining a flat planar surface.

14. The system of claim 12 with said receiving device having a first diameter and with the diameter of said right cylinders being at least around three times said first diameter.

15. The system of claim 12 with said receiving device having a first diameter and with the height of said right cylinder being at least around three times said first diameter.

16. In a system for determining a lighting characteristic of a lighting system, the apparatus comprising: photometer means for providing an output signal having a magnitude varying in accordance with the intensity of light incident thereon and including a receiving device for receiving the incident light, and envelope means for encasing said receiving device and for modulating the intensity of the incident light from the lighting system as a function of the magnitude of the lighting characteristic whereby said photometer means will provide an indication of the magnitude of said lighting characteristic, said envelope means comprising a light transmitting envelope with the transmittance of said envelope varying at selectively spaced locations in accordance with variations in the lighting characteristic, at each of said spaced locations, said envelope having at least at some of said spaced locations blocking means for blocking out a preselected portion thereof such that the total transmittance through said some of said spaced locations has a magnitude related to the magnitude of the lighting characteristic therethrough.

17. The system of claim 16 with said envelope means including a first side wall portion having a development defining a flat planar surface.

18. The system of claim 16 with said blocking means comprising a plurality of spaced generally opaque lines.

19. In a method for determining ESI of a lighting system for a known task and known background, by means of photometer means of providing an output signal having a magnitude varying in accordance with the intensity of light incident thereon and including a receiving device for receiving the incident light, the steps comprising: a first step of providing a first envelope means for encasing said receiving device and for modulating the intensity of the incident light from the lighting system as a function of the magnitude of the background reflectance factor $\beta b$ and obtaining from photometer means an indication of the magnitude of background luminance Lb and a second step of providing a second envelope means for encasing said receiving device and for modulating the intensity of the incident light from the lighting system as a function of the magnitude of the task reflectance factor $\beta t$ and obtaining from said photometer means an indication of the magnitude of task luminance Lt, said second step providing said second envelope means for modulating the intensity of the incident light as a function of the magnitude of the difference between background reflectance factor $\beta b$ and task reference factor $\beta t$, i.e. $(\beta b - \beta t)$ and obtaining from said photometer means an indication of the magnitude of the difference between background luminance Lb and task luminance Lt, i.e. (Lb-Lt).

20. The method of claim 19 comprising the further steps of determining the contrast $C_o$ of the task in a photometric sphere and with Lb and Lt determining the magnitude of CRF, determining the effective background luminance Lbe from the relationship $RCS^{-1}$ to [RCS(Lb)·CRF], determining the sphere reflectance factor of the target background $\rho b$ and determining ESI from the relationship (Lbe)/$\rho b$.

21. A method for providing an envelope for modulating the intensity of incident light in accordance with variations in a lighting characteristic by means of a photometer for providing an output signal having a magnitude varying in accordance with the intensity of light incident thereon and including a receiving device for receiving the incident light, and with the envelope encasing said receiving device for modulating the intensity of the incident light from the lighting system as a function of the magnitude of the lighting characteristic whereby the photometer means will provide an indication of the magnitude of that characteristic, the steps comprising: accumulating data of variations in magnitude of the light characteristic at selected angles, providing on a flat transparent sheet a plurality of lines at locations corresponding to said selected angles with said plurality varying in accordance with the magnitude of the light characteristic at said angles such that the transmittance of said sheet at each said angles will vary in magnitude in accordance with variations in magnitude of the light characteristic at each said angle, folding said flat sheet to define a cylindrical form and locating said cylindrical form over the receiving device.

22. In a system for determining ESI of a lighting system for known targets of task and known background and including photometer means for providing an output signal having a magnitude varying in accordance with the intensity of light incident thereon and including a receiving device for receiving the incident light, and first envelope means for encasing said receiving device and for modulating the intensity of the incident light from the lighting system as a function of the magnitude of the background reflectance factor $\beta b$ whereby said photometer means will provide an indication of the magnitude of background luminance Lb and second envelope means for encasing said receiving device and for modulating the intensity of the incident light from the lighting system as a function of the magnitude of the task reflectance factor $\beta t$ whereby said photometer means will provide an indication of the magnitude of task luminance Lt, with at least one of said first and second envelope means comprising a first light transmitting envelope with the transmittance of said first envelope varying at selectivity spaced locations in accordance with variations in the reflectance $\beta$ of one of the targets effective on the incident light at each of said spaced locations, the method of providing said first envelope comprising: determining for a given viewing angle the magnitude at each of a selected number of angles of incidence the target reflectance factor $\beta$, determining on a transparent sheet selected locations corresponding to each of said selected number of angles, marking at said selected locations a plurality of substantially opaque lines whereby the magnitude of transmittance will correspond to the magnitude of reflectance factor $\beta$ for incident light at said selected angles.

23. The method of claim 22 with said transparent sheet being flat and further comprising the step of forming said sheet into a cylindrical shape.

24. The method of claim 23 further comprising the step of forming a flat sheet model with said plurality of lines, and photoprinting from said flat sheet model and plurality of lines onto said transparent sheet.

25. In a system for determining ESI of a lighting system for known targets of task and known background and including a light transmitting envelope with the transmittance of the envelope varying at selectively spaced locations in accordance with variations in the reflectance $\beta$ of one of the targets effective on the incident light at each of the spaced locations, the method of providing the first envelope comprising: determining for a given viewing angle the magnitude at each of a selected number of angles of incidence the target reflectance factor $\beta$, determining on a transparent sheet selected locations corresponding to each of said selected number of angles, marking at said selected locations a plurality of substantially opaque lines whereby the magnitude of transmittance will correspond to the magnitude of reflectance factor $\beta$ for incident light at said selected angles.

26. The method of claim 25 with said transparent sheet being flat and further comprising the step of forming said sheet into a cylindrical shape.

27. The method of claim 25 further comprising the step of forming a flat sheet model with said plurality of lines, and photoprinting from said flat sheet model said plurality of lines onto said transparent sheet.

28. The method of claim 26 further comprising the step of forming a flat sheet model with said plurality of lines, and photoprinting from said flat sheet model said plurality of lines onto said transparent sheet.

* * * * *

UNITED STATES PATENT AND TRADEMARK OFFICE
CERTIFICATE OF CORRECTION

PATENT NO. : 4,162,853
DATED : July 31, 1979
INVENTOR(S) : Stephen S. Squillace et al It is certified that error appears in the above-identified patent and that said Letters Patent are hereby corrected as shown below:

Column 4, line 33, after "$L = \leq E \beta,$" insert --(4)--.

Column 4, line 23, delete "knowning" and substitute therefor --knowing--.

Column 11, line 18, Claim 19, delete "reference" and substitute therefor --reflectance--.

Signed and Sealed this

Nineteenth Day of February 1980

[SEAL]

*Attest:*

SIDNEY A. DIAMOND

*Attesting Officer*   *Commissioner of Patents and Trademarks*